United States Patent Office 3,388,177
Patented June 11, 1968

3,388,177
PROCESS AND COMPOSITION FOR CHLORI-
NATING ACETYLENE WITH AQUEOUS
CUPRIC CHLORIDE SOLUTIONS TO PRO-
DUCE TRICHLORETHYLENE AND PER-
CHLORETHYLENE
Leslie J. Todd, Grand Island, N.Y., assignor to E. I. du
Pont de Nemours and Company, Wilmington, Del., a
corporation of Delaware
No Drawing. Filed May 13, 1966, Ser. No. 549,821
9 Claims. (Cl. 260—654)

ABSTRACT OF THE DISCLOSURE

Process and composition for chlorinating acetylene with aqueous copper chloride solutions in which the formation of trichlorethylene and/or perchlorethylene is promoted by maintaining at least 50% of the copper in the cupric form while using as a buffer phosphoric acid, acetic acid or one of certain salts thereof in order to maintain low acidity.

Background of the invention

It is known from British Patent 987,553 (published Mar. 31, 1965) that, when acetylene is being chlorinated with an aqueous copper chloride solution, the reaction can be directed in such a way as to favor the formation of trichlorethylene and/or perchlorethylene, provided one maintains more than 50% of the copper in the cupric form while maintaining a relatively low acidity, i.e., a pH-value of 0–3 as defined hereinafter. If less than 50% of the copper exists in the cupric form (i.e., more than 50% is in the cuprous form), or if the system is relatively more acidic, then the reaction tends to produce, instead, the less highly chlorinated products such as trans-dichlorethylene and/or vinylidene chloride.

The reaction of acetylene with cupric chloride to produce either trichlorethylene or perchlorethylene also yields, as a by-product, hydrogen chloride. The reactions are as follows:

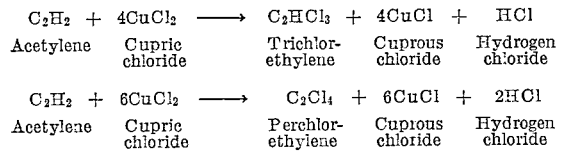

Description of the invention

It has now been discovered that the ability of this reaction system to consistently produce large proportions of trichlorethylene and/or perchlorethylene over long periods of time is greatly improved by having a certain type of buffer present, in order to maintain the desired low acidity level. The buffers found to be useful are phosphoric acid, acetic acid, and certain salts thereof, as defined hereinbelow.

Accordingly, this invention provides processes for producing trichlorethylene and/or perchlorethylene which comprise contacting acetylene at a temperature of from about 60° C. to about 130° C. with an aqueous catalyst composition containing (a) from about 2 mols to about 10 mols of copper chloride per liter of solution, at least 50% of the copper content of which is in the cupric form; and (b) at least 0.1 mol per liter of a buffer from the group consisting of phosphoric acid; acetic acid; the ammonium and alkali metal acetates, mono-hydrogen phosphates, and di-hydrogen phosphates; and mixtures thereof; the amount of the buffer being such that, when said aqueous composition is diluted with an equal volume of distilled water, the resulting diluted solution exhibits a pH-value in the range of about 1 to about 6. This invention also provides aqueous catalyst compositions useful for the chlorination of acetylene, said compositions consisting essentially of the above ingredients in the specified proportions.

The process is carried out at a temperature of from about 60° C. to about 130° C., and preferably from about 80° C. to about 120° C. At temperatures below about 60° C., the reaction tends to proceed too slowly to be economically attractive. The upper limit is determined by pressure considerations. Pressures above about 50 lbs./sq. inch gauge are not generally considered safe when handling acetylene; and at pressures lower than 50 p.s.i.g., the aqueous catalyst compositions tend to lose water too rapidly by evaporation if the temperature exceeds about 130° C. Pressures of about 5 to 20 p.s.i.g. are preferred. The process is usually carried out at temperatures which approximate, or are somewhat lower than, the boiling point of the aqueous catalyst composition at the prevailing pressure.

The total copper content of the aqueous catalyst composition is from about 2 mols to about 10 mols of copper chloride per liter of solution, and preferably from about 4 mols to about 8 mols. In general, high copper contents favor high productivity, i.e., a high productivity of useful chlorinated hydrocarbon products per liter of aqueous composition. On the other hand, as the copper content gets higher, more difficulty is encountered in keeping the salts from precipitating out of the composition. At low temperatures, when the catalyst compositions of this invention are not being used, precipitation of ingredients and/or freezing up of the compositions are not harmful. At working temperatures, however, it is preferable that the ingredients be either dissolved or else in the form of a sufficiently mobile aqueous slurry to be readily pumpable.

In order to maintain the larger amounts of copper salts in solution, it is often desirable to employ one or more supplemental chlorides, as pointed out in Garnett, S.N. 434,702, filed Feb. 23, 1965. The particular supplemental chlorides which are useful in the present invention are the ammonium and alkali metal chlorides, which may be used in concentrations of from about 1 mol to about 4 mols per liter.

At least 50% of the total copper content of the system should be in the cupric form. If the cupric content is less than 50% (i.e., more than 50% is in the cuprous form), the reaction tends to produce mainly dichlorethylenes, rather than trichloroethylene and/or perchloroethylene. As a practical matter, it is difficult to maintain the cupric content close to 100% for any considerable length of time because the cupric chloride is constantly being converted to cuprous chloride as a necessary part of the overall reaction. Furthermore, it is actually advantageous to have moderate amounts of cuprous chloride present because this increases the total amount of copper which can be dissolved in the system, which in turn increases the productivity. All things considered, cupric contents in the range of about 60% to about 90% of the total copper content are preferred.

When the cupric content gets below the desired range, it can be regenerated by treatment with oxygen plus hydrogen chloride. This can be accomplished by periodically shutting off the acetylene feed to the main, or "make," reactor and replacing it by oxygen plus hydrogen chloride until the desired cupric content has been achieved. Alternately, the catalyst composition may be removed either batchwise or continuously, to a separate "oxidizer," into which oxygen plus hydrogen chloride are introduced, all according to methods known in the art. The oxygen may be supplied in the form of air, particularly if the regeneration is carried out in a separate "oxidizer." The regeneration reaction is as follows:

$$4CuCl + 4HCl + O_2 \rightarrow 4CuCl_2 + 2H_2O$$

The buffers which have been found to be useful according to this invention are phosphoric acid, acetic acid, the ammonium and alkali metal acetates, the ammonium and alkali metal mono- and di-hydrogen phosphates, and mixtures thereof. Other buffer materials such as phthalic acid which produce similar effects may also be used.

The amount of the buffer employed is such that, when the aqueous composition is diluted with an equal volume of distilled water, the resulting diluted solution exhibits a pH-value (as measured with a glass electrode) in the range of about 1 to about 6. The number thus determined is referred to herein as the "pH-value." The reason for using this number is that the aqueous compositions themselves, prior to dilution, are frequently so concentrated that it is not truly meaningful to refer to their pH.

At least 0.1 mol of buffer per liter should be present in order to obtain the advantageous results of the present invention. When the acid phosphates (including phosphoric acid) are employed, the concentration is generally between about ¼ mol and about 2 mols per liter, and preferably between about ½ mol and about 1½ mols per liter. The acetates (including acetic acid) are generally employed in concentrations between about ¾ mol and about 5 mols per liter, and preferably between about 1½ mols and about 4 mols per liter. Combinations, for example, of acetic acid plus potassium acetate, or of phosphoric acid plus monoammonium dihydrogen phosphate may advantageously be used, thereby making it possible to achieve excellent control at specific pH-values.

In order to obtain the required pH-values, it is necessary that the hydrogen chloride content of the aqueous catalyst compositions be controlled to some extent, but not nearly as precisely as when no buffer is present. As indicated above, the regeneration reaction involves addition of hydrogen chloride. The amount of hydrogen chloride so added, however, should not be so much in excess of the amount actually required for regeneration that the buffer can no longer compensate for it and bring about the desired pH-value. In general, the amount of hydrogen chloride thus added is not more than 2% in excess of the amount necessary to effect the regeneration, this 2% figure being based upon the weight of the aqueous catalyst composition. Preferably, the amount of excess hydrogen chloride used in the regeneration does not exceed 1%. On the other hand, at least some acidity is needed. Otherwise, if the reaction mixture is neutral or alkaline, the process tends to produce large quantities of acetylene dimers and polymers, which are undesired in the present process. Hydrogen chloride is produced as a by-product of the reaction; and at the same time, hydrogen chloride may be boiled out of the aqueous catalyst composition, especially if the temperature is relatively high and the pressure is relatively low. All of these factors must be taken into consideration when determining the operating parameters, but it is much easier to control the system effectively and continuously when the buffer is present. If the acidity gets too high, the process will tend to yield dichlorethylenes, at the expense of trichlorethylene and/or perchlorethylene.

Other chlorides which may be present in the system include ferric chloride, which tends to keep a high proportion of the copper chloride in the cupric form, and mercury chloride, which tends to promote the activity of certain of the aqueous catalyst compositions.

The acetylene is generally introduced by means of a sparger or other mechanism which facilitates good contact between the acetylene and the aqueous catalyst compositions. Good mixing, as by agitation, is important and may often be the limiting factor in determining the productivity of a given unit.

Due to the corrosive nature of the aqueous catalyst compositions, it is preferred to use corrosion-resistant materials throughout. Graphite or glass-lined kettles may be used. Other vessels may be of phenol-formaldehyde/asbestos or brick-lined steel. Piping may be of phenol-formaldehyde/asbestos or perfluorocarbon-lined steel. Solution-contacting pump parts may be of titanium, tantalum, or perfluorocarbon resin.

The product is generally taken overhead from the "make" reactor and recovered by distillation or other known methods. Unreacted acetylene and certain of the partially chlorinated intermediates (primarily vinylidene chloride) may be recycled. Any hydrogen chloride that is recovered overhead may be employed in the catalyst regeneration step. In preferred embodiments of the present invention, trichlorethylene and/or perchlorethylene constitute more than 50% of the crude mixture of chlorinated hydrocarbon products obtained from the process.

In order to obtain optimum results over a long period of time, it is highly important that the degree of acidity, or the pH-value, be carefully controlled within a narrow range. The optimum degree of acidity varies somewhat depending upon factors such as the average ratio of cupric to cuprous copper, the nature of the product desired, and other factors. Other things being equal, pH-values on the high side, i.e., from about 3 up toward 6, tend to favor the formation of perchlorethylene, whereas somewhat lower pH-values, i.e., from about 2 to about 4, tend to favor the formation of trichlorethylene. The pH-values employed in the present invention are, generally speaking, somewhat higher than those used in the prior art, primarily because this invention makes it possible to control the pH-value accurately at these higher levels by means of the use of the particular buffers.

In the absence of the buffer, it is difficult to control the amount of hydrogen chloride addition in the "oxidizer" step precisely enough to give good control of the pH-value. Furthermore, hydrogen chloride is continuously being produced in the "make" reactor, some of which may continuously be undergoing removal via the gases being taken off overhead. If it were possible to control all of these variables with absolute precision in a large-scale plant, it might be possible to obtain good results without the buffer. As a practical matter, however, this high degree of precision is not attainable over any considerable period of time, and the presence of the buffer produces major commercial advantages, in terms of both the total productivity, and the proportion of the desired product that is present in the crude mixture of chlorinated hydrocarbons obtained.

The following examples are intended to illustrate, but not to limit, the invention.

EXAMPLE 1

A two-liter steam-jacketed glass kettle (often designated as a "resin kettle") was modified by adding a vaned disc agitator and baffles. The kettle was charged with an aqueous catalyst solution made up of 3 mols of cupric chloride ($CuCl_2$), 3 mols of potassium chloride (KCl), 1 mol of phosphoric acid ($H_3PO_4$), and sufficient water to make 1 liter of total volume. The vapor space above the catalyst solution was connected to a condenser and a receiver to condense out and collect the crude mixture of chlorinated hydrocarbons produced. This crude mixture was distilled to recover the trichlorethylene produced. Acetylene was introduced at the rate of about 0.7 liter (standard temperature and pressure) per minute into the agitated aqueous catalyst solution through a glass frit sparger located below the agitator. The agitated solution was maintained at about 95° C. The free hydrogen chloride content of the aqueous catalyst solution was maintained below about 2%; and the pH-value remained in the range of about 2 to about 6. As the reaction proceeded, the ratio of cupric to cuprous copper decreased. Analyses of the crude chlorinated hydrocarbon product were made at various stages. When the aqueous catalyst solution contained 93% of the copper in the cupric form, the crude product contained 28% trichlorethylene. When the cupric content was reduced to 50%, the crude product produced at that time still contained 9% trichlorethylene.

EXAMPLE 2

A similar run was made with an aqueous catalyst solution containing 3 mols per liter of $CuCl_2$, 3 mols per liter of KCl, and 3 mols per liter of acetic acid. The acidity exhibited by this solution was lower than that exhibited by the phosphoric acid-containing solution of Example 1. The crude product contained 60% of trichlorethylene at the stage where 94% of the copper was in the cupric form, and 45% of trichlorethylene at the stage where 81% of the copper was in the cupric form.

EXAMPLE 3

A catalyst composition was prepared, containing 5.33 mols per liter of cupric chloride ($CuCl_2 \cdot 2H_2O$), 2.24 mols per liter of cuprous chloride (CuCl), 2.50 mols per liter of potassium chloride (KCl), 3.79 mols per liter of acetic acid, and 21% by weight of water. This composition was prepared by mixing together the CuCl and KCl and running them through a sieve. About 63% of the total amount of glacial acetic acid was added, followed by the $CuCl_2 \cdot 2H_2O$. This mixture was heated to 95° C. with stirring and half of the total amount of water was added. The mixture was pasty. About five hours later, the remaining water was added and subsequently the remaining glacial acetic acid. The density of the mixture at 95° C. was 1.70, and about 74% of the copper was in the cupric form.

Acetylene was introduced into 600 ml. of this aqueous catalyst composition at the rate of 2.25 liters per minute. The temperature was maintained at 95° C. and agitation was provided by a 2000 r.p.m. stirrer. The initial product recovered contained 60.94% trichlorethylene, 21.73% trans-dichlorethylene, and 4.48% perchlorethylene. By the time that the cupric content had been reduced to 58%, the product contained 29.83% trichlorethylene and 60.89% trans-dichlorethylene. The productivity was 2.82 grams of total product per liter of aqueous catalyst composition per minute.

By using a combination of a "make" reactor plus an oxidizer, with the aqueous catalyst solution being circulated rapidly between the two, it is possible to maintain a fairly constant ratio of cupric to cuprous copper, as well as a much more constant level of acidity, in the "make" reactor. By using such equipment and by operating within the preferred ranges set forth hereinabove, good productivities are readily obtainable, and amounts of trichlorethylene and/or perchlorethylene can be obtained in excess of 50% by weight of the crude mixture of chlorinated hydrocarbon products.

I claim:
1. A process for producing trichlorethylene and/or perchlorethylene which comprises contacting acetylene at a temperature of from about 60° C. to about 130° C. with an aqueous catalyst composition containing (a) from about 2 mols to about 10 mols of copper chloride per liter of solution, at least 50% of the copper content of which is in the cupric form; and (b) at least 0.1 mol per liter of a buffer from the group consisting of phosphoric acid; acetic acid; the ammonium and alkali metal acetates, mono-hydrogen phosphates, and di-hydrogen phosphates; and mixtures thereof; the amount of the buffer being such that, when said aqueous composition is diluted with an equal volume of distilled water, the resulting diluted solution exhibits a pH-value in the range of about 1 to about 6.

2. A process according to claim 1 wherein the temperature is from about 80° C. to about 120° C.

3. A process according to claim 1 wherein the aqueous composition contains from about 4 to about 8 mols per liter of copper chloride.

4. A process according to claim 1 wherein from about 60% to about 90% of the copper chloride is in the cupric form.

5. A process according to claim 1 wherein the aqueous composition contains from about 0.1 mol to about 2 mols of phosphoric acid per liter.

6. A process according to claim 1 wherein the aqueous composition contains from about ¾ mol to about 5 mols of acetic acid per liter.

7. A process according to claim 1 wherein the aqueous composition contains from about 2 mols to about 4 mols per liter of a supplemental chloride from the group consisting of ammonium and alkali metal chlorides.

8. A process for producing trichlorethylene and/or perchlorethylene which comprises contacting acetylene at a temperature from about 80° C. to about 120° C. with an aqueous composition containing (a) from about 4 to about 8 mols of copper chloride per liter of solution, at least 50% of the copper content of which is in the cupric form; (b) from about 2 mols to about 4 mols per liter of a supplemental halide from the group consisting of ammonium and alkali metal halides; and (c) a phosphoric acid buffer in an amount from about ½ mol to about 2 mols per liter; the amount of the buffer being such that, when said aqueous solution is diluted with an equal volume of distilled water, it exhibits a pH-value of from about 1 to about 6.

9. An aqueous catalyst composition useful for the chlorination of acetylene, said composition consisting essentially of (a) from about 2 mols to about 10 mols of copper chloride per liter of solution, at least 50% of the copper content of which is in the cupric form; and (b) at least 0.1 mol per liter of a buffer from the group consisting of phosphoric acid; acetic acid; the ammonium and alkali metal acetates, mono-hydrogen phosphates, and di-hydrogen phosphates; and mixtures thereof; the amount of the buffer being such that, when said aqueous composition is diluted with an equal volume of distilled water, the resulting diluted solution exhibits a pH-value in the range of about 1 to about 6.

No references cited.

BERNARD HELFIN, *Acting Primary Examiner.*

J. A. BOSKA, *Assistant Examiner.*